UNITED STATES PATENT OFFICE.

HENRI HERRENSCHMIDT AND MARMADUKE CONSTABLE, OF SYDNEY, NEW SOUTH WALES.

PROCESS OF EXTRACTING OXIDES OF COBALT FROM ORES.

SPECIFICATION forming part of Letters Patent No. 303,514, dated August 12, 1884.

Application filed March 29, 1883. (Specimens.)

*To all whom it may concern:*

Be it known that we, HENRI HERRENSCHMIDT, metallurgist, and MARMADUKE CONSTABLE, gentleman, both subjects of the Queen of Great Britain, residing at Sydney, in the British Colony of New South Wales, have invented an Improvement in Processes of Extracting the Oxides of Cobalt from Ores; and we do hereby declare that the following is a full, clear, and exact description of the invention, which will enable others skilled in the art to which it appertains to make and use the same.

We are aware that sulphate of iron has been employed to extract copper and manganese from their ores by boiling the ore in a solution of said sulphate of iron, and do not claim, broadly, such use; but we are not aware that cobalt has ever been extracted by means of sulphate of iron in the manner described herein.

Our invention consists in the use of sulphate of iron, or any substance or compound which will form sulphate of iron, for the purpose of extracting the oxides of cobalt from their ores in the form of sulphates, in which form they are easily converted into oxides by old and well-known processes. The theory of our process is to decompose the sulphate of iron in the presence of the ores containing the oxides of cobalt, so that the sulphate of iron shall be converted into oxide of iron and the oxides of cobalt into sulphates, in which condition the sulphates are washed out and reconverted into oxides.

In practice we prefer the following mode of procedure: The ore must first be crushed or ground very fine, and its percentage of oxides of cobalt ascertained. We then add sufficient sulphate of iron to convert the said oxides into sulphates. The ore, if not wet crushed, should have sufficient water added to it to make it into a slime. In this condition we boil it for half an hour in any suitable vessel, by which time the whole of the oxides will have been converted into sulphates and held in solution by the liquor in which the slime has been boiled. We then decant and wash the thick residue of all remaining solution, so as to remove all trace of said sulphates, and these solutions we then treat with any of the well-known materials for reconverting said sulphates into oxides. If the slime is put into cold water and allowed to remain there, say, for twenty-four hours, the most of the oxides will have been converted into sulphates; but this makes the process tedious, and is not so efficacious as when the slime is boiled. Again, instead of boiling, the sulphate of iron in the shape of a salt may be mixed with the dry crushed ore, and heated in a furnace until the double decomposition above referred to has taken place—that is, until the sulphate of iron has been converted into an oxide of iron, and the oxides of cobalt into sulphates of the same. These sulphates may then be washed out with cold water and precipitated in the form of oxides, as before.

We are aware that it has been proposed to employ sulphate of iron in connection with chloride of sodium, black oxide of manganese, and saltpeter made into a fixed alkali by admixture of charcoal, for the reduction of gold, silver, or copper ores to chlorides, in a closed retort; but this differs from our invention, because the substances employed and treated are different, and because the product is chlorides, while we produce sulphates.

Having thus described the nature of our invention and the manner of performing same, we would have it understood that our process only relates to the extraction of the oxides of cobalt and manganese from their ores in the form of sulphates, in which form they are easily convertible into oxides by old and well-known chemical processes.

What we believe to be new, and therefore claim as our invention, is—

The process herein described of extracting cobalt in the form of sulphates, which consists in subjecting the pulverized ore to the action of finely-divided sulphate of iron, with water or heat, or both, whereby the iron is converted into oxide and the cobalt into sulphate, substantially as set forth.

H. HERRENSCHMIDT.
MARMADUKE CONSTABLE.

Witnesses:
EDWD. WATERS,
P. A. SMITH.